United States Patent Office 2,890,069
Patented June 9, 1959

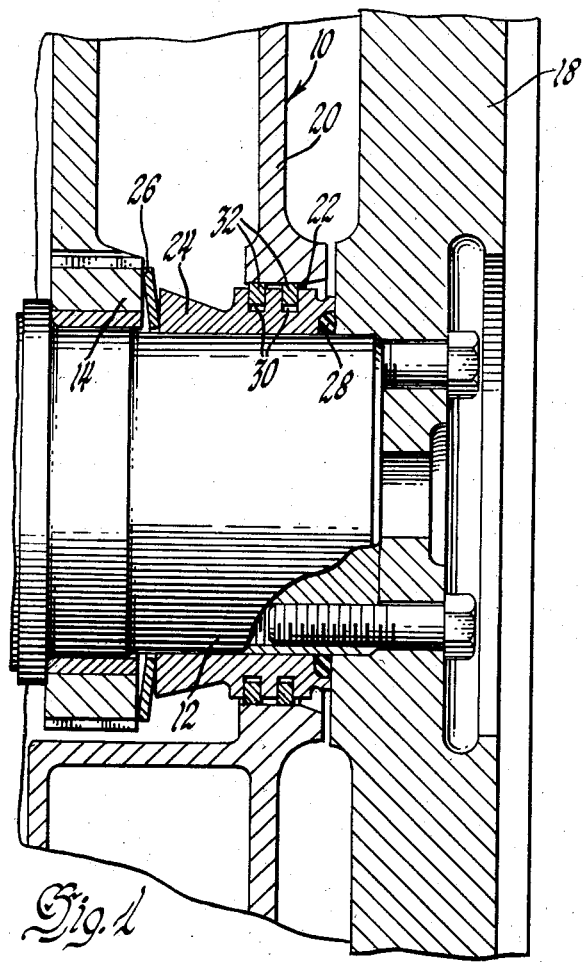

2,890,069
ROTARY SEAL

Stephen A. Larkin and Norman H. Ledwan, Detroit, Mich., assignors to General Motors Corporation, Detroit, Mich., a corporation of Delaware Application April 10, 1956, Serial No. 577,318

7 Claims. (Cl. 286—5)

This invention relates to sealing devices applied to rotary members such as shafts associated with relatively fixed casings or like elements and more particularly relates to seals of the type wherein a grooved annular member is equipped with a ring which bears upon a cylindrical surface of a co-acting member embracing the grooved annular member.

The instant invention has particular application to the crankshaft bearing seals for internal combustion engines or other reciprocating engine devices. In such engines, the shaft sealing problem is compounded by the cyclic torsional and deflective loadings imposed on the crankshaft which result in axial and radial vibratory movement of the shaft relative to the casing and the seal.

Among the principal objects of the invention is to provide an improved seal of the type described to prevent the passage of fluid from one side to the other of the casing element while permitting limited radial and axial movement of the shaft element relative to the casing element.

Another object of this invention is to provide an improved split ring seal particularly designed for use in shaft and housing installations where lubrication is needed in one portion of the installation but it is desired to maintain another portion of the installation relatively free of lubricant.

Still another object of this invention is to provide a split ring seal which will act as a barrier to the flow of lubricant between a housing and a shaft and will also effectively serve to return any excess lubricant from a relatively dry portion of the installation to a lubricant-receiving portion of the installation.

A further and more specific object of the invention is to provide a split ring seal which will act as a barrier to the flow of lubricant between a housing and a shaft and also serve to return lubricant from a relatively dry side of the seal to a lubricant-receiving side of the seal while accommodating axial and radial vibratory movement of the shaft relative to the casing.

The foregoing and other objects, features and advantages of the invention will become apparent from the following detailed description of several embodiments thereof in which reference is made to the attached drawing, in which:

Figure 1 is an axial sectional view of a portion of an engine adjacent the rear crankshaft bearing and showing a bearing seal embodying the invention interposed between the shaft and a portion of the engine housing.

Figure 2 is a somewhat enlarged elevational view showing the end portions of one form of split ring which may be utilized in the seal construction shown in Figure 1.

Figure 3 is a view similar to Figure 2 showing the end portions of a second form of split ring which may be utilized in the seal construction shown in Figure 1.

Figure 4 is a view of a split ring similar to that of Figure 3 with the ends disposed to accommodate a reverse direction of rotation for the crankshaft.

Figure 5 is a perspective view showing the form of split ring of Figures 3 and 4 prior to assembly.

Referring more particularly to the drawing, Figure 1 shows portions of an engine including an engine housing 10 and a crankshaft 12 suitably journaled therein by bearing means, not shown. The bearing means is lubricated by conventional means also not shown, such as crankcase splash or a pressurized lubricant supply system. A timing gear 14 is mounted on the shaft 12 in axially spaced relation to a flywheel or ring gear 18 secured to the end thereof. Intermediate the flywheel 18 and the gear 14, the housing is provided with a web 20 having a bore 22 therethrough in spaced concentric relation with the end portion of the crankshaft.

A seal assembly constructed in accordance with the invention is mounted in the space intermediate the bore 22 and the crankshaft and divides the housing 10 into a lubricant-receiving portion to the left of the seal as viewed in Figures 1–4 and a relatively dry portion shown to the right of the seal. The seal assembly includes an annular carrier member 24 which is slidably mounted on the end portion of the crankshaft. An annular spring washer 26 is interposed between the adjacent end faces of the gear 14 and the carrier and biases the carrier towards the flywheel. An O-ring 28 of resilient material is mounted in a counterbore formed in the flywheel end of the carrier, and is compressed between the carrier, shaft, and flywheel by the biasing action of the spring 26 to form a resilient frictional driving connection and static seal between the shaft and carrier.

The carrier member 24 is provided with one or more outwardly facing circumferential grooves 30 of rectangular cross section, each having axially spaced parallel side walls or shoulders interconnected by a bottom wall or land of reduced diameter. A piston-type sealing ring 32 of rectangular cross section and split at one point to form a gap is mounted in each of the grooves 30. These rings each have a self-contained radial biasing action urging the ring outwardly into non-rotative sealing contact with the bore 22. In the embodiment shown in Figure 1, the depth of the grooves 30 is such that the inwardly facing surface of each ring is in spaced relation to the bottom wall of the respective groove thereby permitting the seal to accommodate radial deflections of the end of the shaft.

Split piston-type sealing rings are available in a variety of end gap configurations suitable for use in practicing the instant invention. Figures 2–5 show two preferred types of end gap configuration; the ring 32 shown in Figure 2 has an end gap configuration of the so-called step-cut type; and rings 32' and 32" shown in Figures 3–5 have so-called oblique-cut gaps. As will be noted from the drawing, the gaps provided by ring ends 34, 36; 34' 36' and 34", 36" of the rings 32, 32' and 32", respectively, are stepped or inclined to extend transversely of the ring toward the wet side of the seal in the direction of shaft rotation.

In accordance with the invention each sealing ring is provided with a uniform spiral set such that the axial dimension across the offset ends of the ring prior to its installation in one of the carrier grooves 30 is in excess of the axial width of the groove; the width of each groove being such as would normally provide a running fit or clearance between the side walls of the groove and the adjacent end faces of the ring. This side wall clearance is exaggerated in Figures 2, 3 and 4 for the purpose of illustration but is preferably equal to or slightly in excess of that normally used in such piston-type ring oil seals. Axial compression of the ring occurs when it is inserted in its groove on the seal carrier. This forces the side faces of the ring into lubricant-wiping contact with the side walls of the groove adjacent the opposite ends of the ring.

The hand of the spiral of each ring is such that the end of the ring, designated by the numerals 34, 34' or 34" in Figures 2, 3 and 4, respectively, bearing on the relatively dry or right side of the groove, is downstream of the lubricant carried within the groove; in other words, is in the direction of shaft rotation from the end of the ring indicated at 36, 36' or 36" in the several figures which bears on the relatively wet or left side of the groove. With this relationship the wiping action provided by the ring end 34 results in the scraping of excess lubricant from the relatively dry side of the groove and forcing such excess lubricant through the gap between the ends of the ring to the relatively wet side of the seal where the wiping action of the ring end 36 tends to pump it from the groove. Preferably, the axial biasing action of the ring is limited so that the body of the lubricant will maintain a suitable lubricating film between the ends of the ring and the side walls of the groove.

In the instant seal construction, axial vibratory movement between the sealed portion of the shaft and the carrier is accommodated by the damping interaction of the spring washer 26 and the O-ring 28. The spiraled mounting of the sealing ring in the carrier groove also serves to maintain the ring in centered relation axially of the groove side walls thereby preventing undesirable pumping of lubricant from the groove which is characteristic of conventional seals of this type where the sealed portion of the shaft or ring carrier is subjected to axial vibratory movement.

While several modifications of the invention have been shown and described for the purpose of illustration, it is appreciated that various modifications may be made without departing from the spirit and scope of the invention as defined in the following claims.

We claim:

1. A fluid seal comprising, in combination, two members mounted for rotation relative to each other about a common axis, said members having substantially parallel surfaces defining an annular space therebetween, one of said members having an annular groove therein opening toward the surface of the other of said members, a ring mounted in said groove and maintained in non-rotative sealing contact with the other of said members to divide a relatively wet liquid receiving side of said seal from the opposite relatively dry side of said seal, said ring being split at one point to define a gap between the ends thereof and being of a configuration to resiliently maintain the side surfaces of the ring adjacent the ends thereof in liquid wiping relation with the opposite sides of said groove, the side surface of the ring end disposed in the direction of rotation of said one member being maintained in liquid-wiping relation to the relatively dry side of said groove and the side surface of the ring adjacent the opposite end thereof being maintained in liquid-wiping relation to the relatively wet side of said groove, whereby rotation of said one member causes said first-mentioned ring end to wipe excess liquid from the relatively dry side of said groove and forces such liquid through said gap and said opposite end of said ring forces such liquid radially outwardly of said groove on to the wet side of said seal.

2. A fluid seal as set forth in claim 1 in which said gap extends obliquely of said ring toward said relatively wet side of the seal in the direction of rotation of said one member.

3. A fluid seal comprising, in combination, two members mounted for rotation relative to each other about a common axis, said members having substantially concentric surfaces defining an annular space therebetween, one of said members having an annular groove therein opening toward the surface of the other of said members, a ring mounted in said groove and having a radially outwardly biasing spring action maintaining said ring in non-rotative peripheral sealing contact with the other of said members to divide a relatively wet lubricant-receiving side of said seal from a relatively dry side thereof, said ring being split at one point to define a gap between the ends thereof and having a uniform spiral set axially offsetting said ends to an axial dimension exceeding the width of the groove prior to installation in said groove, said spiral set being of a hand to resiliently maintain the side surface of the ring adjacent the end thereof disposed in the direction of rotation of said one member in liquid-wiping relation to the relatively dry side of said groove and to resiliently maintain the opposite side surface of the ring adjacent the opposite end thereof in liquid-wiping relation to the relatively wet side of said groove, whereby upon relative rotation of the members excess lubricant is positively wiped from the relative dry side of the groove by the dry-side engaging end of the ring and is forced through said gap to the wet side of the groove from which it is forced radially outwardly by the positive wiping action of the dry-side engaging end of the ring.

4. A fluid seal as set forth in claim 1 in which said gap extends obliquely of said ring toward said relatively wet side of said seal in the direction of rotation of said one member relative to said other member.

5. A seal comprising, in combination, a stationary housing, a rotatable cylindrical member positioned within said housing, said housing having a bore therein concentrically embracing said member in spaced relation, said member having at least one annular groove opening on said housing bore, and a split ring fitting within said groove and bearing against a portion of said housing to divide said housing into a lubricant-receiving chamber and a relatively dry chamber, the ends of said ring defining a gap inclined toward the lubricant-receiving side of said housing in the direction of rotation of said rotatable member and being axially disposed of each other to maintain a side surface adjacent the ring end disposed in the direction of rotation of the cylindrical member in lubricant-scraping relation to the dry side of the groove and to maintain the side surface adjacent the opposite end of the ring in similar relation to the relatively wet side of the groove adjacent the opposite ring end, whereby during rotation of said member said ends scrape excess lubricant from the walls of said groove and pass such excess lubricant to the relatively wet side of said housing.

6. A fluid seal for a rotary shaft comprising, in combination, a housing member having a bore therein in spaced concentric relation to said shaft member, an annular member mounted on said shaft member within said housing bore, said annular member having a circumferential groove facing said bore, a split ring mounted within said groove having self-contained radial biasing action urging said ring into circumferential non-rotative sealing contact with said bore, said ring and said annular member dividing said housing into a lubricant-receiving portion and a relatively dry portion, the ends of said ring forming a gap extending transversely of the ring toward the lubricant-receiving side of said housing in the direction of rotation of said rotatable member, said ring ends being axially offset from each other to maintain the end of said ring downstream of the flow of lubricant relative to the ring in bearing engagement with the dry side of said groove and to maintain the other end of said ring in bearing engagement with the relatively wet side of said groove, thereby maintaining said ring axially centered of said groove irrespective of axial movement of the shaft and carrier and removing excess lubricant from the wall of said groove on the relatively dry side of said ring during rotation of said shaft and annular member relative to the ring and housing and returning it through the gap formed by the ends of said ring and forcing such lubricant radially outwardly from the wet side of said groove into the lubricant-receiving portion of said housing.

7. A fluid seal for a rotary member comprising, in combination, an annular member slidably mounted on said rotary member, means resiliently snubbing said annular member to said rotary member, a housing member having a bore therein in spaced concentric relation to said annular member, said annular member having an annular groove formed therein facing said bore, a sealing ring mounted within said groove in spaced relation with the inner cylindrical surface of said annular groove and dividing said housing into a lubricant-receiving portion and a relatively dry portion, said ring being of a split type the ends of which define a gap inclined toward the lubricant-receiving side of said housing in the direction of rotation of said rotary member, said sealing ring having a self-contained biasing action urging said ring outwardly into peripheral non-rotative sealing contact with said housing bore and urging the ends of said ring into bearing engagement with opposite side walls of the groove so that the ring extends across the groove from the relatively dry side of said groove to the relatively wet side of said groove in the direction of rotation of the rotary member, whereby rotation of said rotary member causes said ends to wipe excess lubricant from the walls of said groove returning it to the lubricant-receiving portion of said housing.

References Cited in the file of this patent

UNITED STATES PATENTS

| | | |
|---|---|---|
| 1,514,234 | Severin | Nov. 4, 1924 |
| 2,267,262 | Bast | Dec. 23, 1941 |
| 2,570,427 | Chillson et al. | Oct. 9, 1951 |
| 2,812,196 | Atkinson | Nov. 5, 1957 |

FOREIGN PATENTS

| | | |
|---|---|---|
| 203,177 | Great Britain | Sept. 6, 1923 |